Nov. 26, 1946.  R. M. HEINTZ  2,411,571
ENGINE
Filed Jan. 22, 1945

INVENTOR.
RALPH M. HEINTZ
BY
ATTORNEY

Patented Nov. 26, 1946

2,411,571

UNITED STATES PATENT OFFICE 2,411,571

ENGINE

Ralph M. Heintz, Cleveland, Ohio, assignor, by mesne assignments, to Jack & Heintz Precision Industries, Inc., Cleveland, Ohio, a corporation of Delaware Application January 22, 1945, Serial No. 573,825

13 Claims. (Cl. 123—56)

This invention relates to improvements in rotary sleeve valve engines and has for one of its primary objects to provide a sleeve valve having a combined reciprocating and oscillating movement with respect to the cylinder and sleeve axes and an improved efficient and simple means for imparting combined movement to the sleeve valve for insuring a sufficient movement and sliding contact of the sleeve valve and its ports therein with the cylinder in all directions to effect a complete removal of any carbon deposits in the ports that might otherwise accumulate.

To this end it is proposed to so arrange the two opposed cylinders and their rotary sleeve valves of a pancake rotary sleeve valve engine that their respective axes are offset but parallel. Each of the opposed sleeve valves is provided with an integral helical driven ring gear and a correspondingly helical integral cam groove. A pair of circular concentric driving ring gears are carried by a common shaft for driving the two helical driven gears. This shaft also carries two circular concentric discs to separately engage the two helical cam grooves on the sleeve valves. The shaft has its axis offset from but parallel with the axes of the cylinders and their sleeve valves. The cam grooves are such that the discs engaging them cause the two opposed sleeve valves to be moved in the same linear direction back and forth as one moves outwardly while the other moves inwardly as the driving gears keep in mesh with the helical driven gears to rotate the valves.

Figure 1:
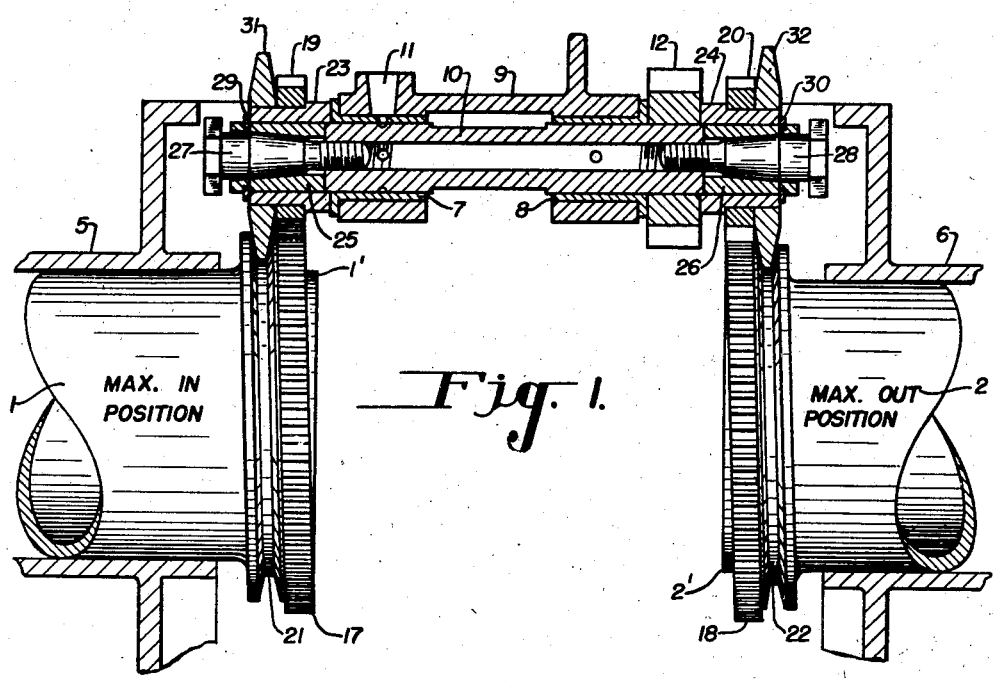
Figure 2:
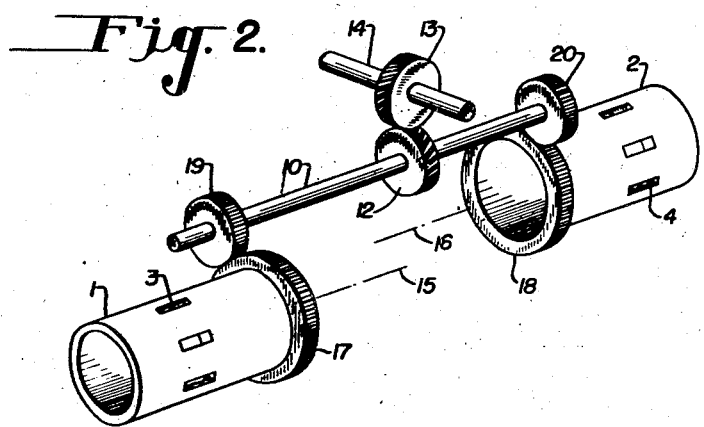

With the foregoing and other objects in view, the invention resides in the combination of parts and in the details of construction hereinafter set forth in the following specification and appended claims, certain embodiments thereof being illustrated in the accompanying drawing, in which:

Figure 1 is a fragmentary view partly in longitudinal section and partly in side elevation of the opposed sleeve valve construction and actuating means for rotation and reciprocation; and Figure 2 is a schematic view in perspective of the two opposed offset sleeve valves and the gear train for rotating them.

Referring more particularly to the drawing, the two opposed sleeve valves 1 and 2 are provided with conventional ports 3 and 4 and mounted for rotational and reciprocatory movement in opposed cylinders 5 and 6.

Mounted in bearings 7 and 8 in an engine casting 9 is a hollow rotatable shaft 10, there being provided a lubricant cup 11. Keyed to shaft 10 is a gear 12 that is adapted to be driven by a gear 13 mounted on a shaft 14 driven in any suitable manner by the engine.

The two sleeve valves 1 and 2 have their axes offset and parallel as is indicated by the respective dot and dash lines 15 and 16 in Figure 2 which also shows the sleeve valves to have ring gears 17 and 18 meshing with ring gears 19 and 20 carried by shaft 10. This shaft 10 has its axes offset but parallel with axes 15 and 16 to rotate gears 17 and 18 and the sleeve valves 1 and 2 accordingly in the same direction, while permitting individual timing of the ports.

As shown in Figure 1 the two ring gears 19 and 20 rotate in a circular path whereas ring gears 17 and 18 are progressively longitudinally helical to positions of maximum offset at diametrically opposed points 1' and 2' of the inner ends of sleeves 1 and 2. On the outer side of helical gears 17 and 18 in the sleeve valves 1 and 2 are formed helical groove guideways 21 and 22 of a pitch corresponding to and equal to its respective helical gear, each helical gear 17 and 18 and each helical groove guideway being parallel to each other and oblique to their respective sleeves 1 and 2 and to their respective discs and gears 31 and 19 and 32 and 20.

Gears 19 and 20 are keyed to collars 23 and 24 which are keyed to bushings 25 and 26 receiving wedge pins 27 and 28 screw threaded in hollow shaft 10 and retained by suitable snap rings 29 and 30. Also secured to collars 23 and 24 are tapered discs 31 and 32. Accordingly, as shaft 10 is rotated the two gears 19 and 20 and the two groove guideways 21 and 22 are driven in the same direction as each other. However, as explained in connection with Figure 2, the axes of the sleeve valves 1 and 2 are offset and the shaft 10 is offset to bring gears 19 and 20 in engagement with gears 17 and 18 on opposite sides of top center thereof to impart a rotation to gears 17 and 18 in the same direction. Discs 31 and 32 are driven in unison with gears 19 and 20 and engage the helical groove guideways 21 and 22 of the sleeve valves. Discs 31 and 32 rotate in constant planes parallel to gears 19 and 20 which are at right angles to the axes of the shaft 10 and the sleeves 1 and 2, whereas spiral groove guideways 21 and 22 and spiral gears 17 and 18, while rotating in planes parallel to each other, are oblique to the axes of rotation of the sleeves 1 and 2, discs 31 and 32 and gears 19 and 20. Due to the fact that the helix of guideway 21 is equal in pitch to that of guideway 22, disc 31 forces sleeve valve 1 to be reciprocated to the right to the maximum "in" position and disc 32 simultaneously causes sleeve valve 2 to be correspondingly reciprocated to the right to the maximum "out" position. It is to be clearly understood that as the two discs are reciprocating the two sleeve valves the two helical gears 17 and 18 are of the same helical pitch as the two helical guideways 21 and 22 which keeps gears 17 and 18 in constant uniform mesh with the two circular driving gears 19 and 20 to rotate the sleeve valves as they reciprocate.

It will be appreciated that the extent of reciprocatory movement of the two rotary sleeve valves need only be slight, the primary purpose being to assist in the automatic removal of carbon deposit that might otherwise occur in the valve ports, this being accomplished by the scraping action of the valve with the cylinder both by the rotary and reciprocatory movements of the valves.

I claim:

1. In a sleeve valve engine a sleeve valve and a driven helical ring gear carried thereby, a circular ring gear carried by a shaft for driving said helical driven gear, a helical guideway of a pitch equal to that of said helical gear and rigid with said sleeve valve, a circular disc carried by said shaft to be rigid with said driving gear and adapted to engage said helical guideway to reciprocate said sleeve valve as said circular driving gear remains in mesh with said helical driven gear to rotate said sleeve valve.

2. In a sleeve valve engine a sleeve valve and a driven helical ring gear carried thereby, a circular ring gear carried by a shaft for driving said helical driven gear, a helical guideway of a pitch equal to that of said helical gear and rigid with said sleeve valve, a circular disc carried by said shaft to be rigid with said driving gear and adapted to engage said helical guideway to reciprocate said sleeve valve as said circular driving gear remains in mesh with said helical driven gear, due to the reciprocation of said sleeve valve by said disc in its engagement with its guideway to rotate said sleeve valve.

3. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, a common drive shaft carrying two spaced circular driving gears each to engage one of said helical driven gears and two spaced discs each to engage one of said helical guideways of said sleeve valves to rotate said sleeve valves in the same direction and to simultaneously reciprocate said valves in the same linear direction in their opposed cylinders.

4. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, a common drive shaft carrying two spaced circular driving gears each to engage one of said helical driven gears and two spaced discs each to engage one of said helical guideways of said sleeve valves to rotate said sleeve valves in the same direction and to simultaneously reciprocate said valves in the same linear direction in their opposed cylinders as said circular driving gears remain in mesh with said helical driven gears.

5. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, a common drive shaft carrying two spaced circular driving gears each to engage one of said helical driven gears and two spaced discs each to engage one of said helical guideways of said sleeve valves to rotate said sleeve valves in the same direction and to simultaneously reciprocate said valves in the same linear direction in their opposed cylinders as said circular driving gears remain in mesh with said helical driven gears, due to the reciprocation of said sleeve valves by said discs in their engagement with their respective guideways.

6. In a sleeve valve engine, a pair of opposed cylinders each having a sleeve valve, each valve having a helical gear and a helical groove guideway coaxial and rigid therewith, the axes of said cylinders and their sleeve valves being offset and parallel with relation to each other, a common drive shaft having its axis parallel to those of said sleeves and carrying two spaced circular driving gears and two spaced discs to engage with its respective helical driven gear and guideway of said sleeve valves to rotate said valves in the same directions and to simultaneously reciprocate said valves in the same linear direction in their opposed cylinders.

7. In a sleeve valve engine, a pair of opposed cylinders each having a sleeve valve, means for simultaneously rotating and reciprocating said sleeve valves in the same directions, said means comprising a helical gear and a helical groove guideway of equal pitch formed integrally and coaxially adjacent on each sleeve valve, a common drive shaft carrying two spaced circular driving gears each to engage one of said helical gears and two spaced discs each engaging one of said guideways of said sleeve valve to rotate said sleeve valves in the same direction and to simultaneously reciprocate said valves in the same linear direction in their opposed cylinders.

8. In a sleeve valve engine, a pair of opposed cylinders each having a sleeve valve, means for simultaneously rotating and reciprocating said sleeve valves in the same directions, said means comprising a helical gear and a helical groove guideway of equal pitch formed integrally and coaxially adjacent on each sleeve valve, a common drive shaft carrying two spaced circular driving gears each to engage one of said helical gears and two spaced discs each engaging one of said guideways of said sleeve valve to rotate said sleeve valves in the same direction and to simultaneously reciprocate said valves in the same linear direction in their opposed cylinders.

9. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, the axes of said cylinders and their sleeve valves being offset and parallel with relation to each other, a common drive shaft having its axis parallel to the axes of said sleeve valves and carrying two spaced circular driving gears each to engage one of said helical driven gears and two spaced discs each to engage one of said helical guideways of said sleeve valves to rotate said sleeve valves in the same direction and to simultaneously reciprocate said valves in the same linear direction in their opposed cylinders.

10. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, the axes of said cylinders and their sleeve valves being offset and parallel with relation to each other, a common drive shaft having its axis parallel to the axes of said sleeve valves and carrying two spaced circular driving gears each to engage one of said helical driven gears and two spaced discs each to engage one of said helical guideways of said sleeve valves to rotate said sleeve valves in the same direction and to simultaneously reciprocate said valves in the same linear direction in their opposed cylinders as said circular driving gears remain in mesh with said helical driven gears.

11. In a sleeve valve engine, a pair of opposed cylinders each having a sleeve valve, each valve having a helical gear and a helical groove guideway of a pitch equal to that of the helical gear, said gear and guideway being coaxial and rigid with its sleeve, the axes of said cylinders and their sleeve valves being offset and parallel with relation to each other, a common drive shaft having its axis parallel to the axes of said sleeve valves and carrying two spaced circular driving gears each to engage one of said helical driven gears to two spaced discs each to engage one of said helical guideways of said sleeve valves to rotate said sleeve valves in the same direction and to simultaneously reciprocate said valves in the same linear direction in their opposed cylinders as said circular driving gears remain in mesh with said helical driven gears, due to the reciprocation of said sleeve valves by said discs in their engagement with their respective guideways.

12. In a sleeve valve engine, a pair of opposed cylinders each having a sleeve valve, means for simultaneously rotating and reciprocating said sleeve valves in the same directions, said means comprising a helical gear and a helical groove guideway of equal pitch formed integrally and coaxially adjacent on each sleeve valve, the axes of said cylinders and their sleeve valves being offset and parallel with relation to each other, a common drive shaft having its axis parallel to the axis of said sleeves and carrying two spaced circular driving gears each adapted to mesh with and drive one of said helical gears and two spaced discs each adapted to engage one of said guideways of said sleeve valves to rotate said sleeve valves in the same direction and to simultaneously reciprocate said valves in the same linear direction in their opposed cylinders.

13. In a sleeve valve engine, a pair of opposed cylinders each having a sleeve valve, means for simultaneously rotating and reciprocating said sleeve valves in the same directions, said means comprising a helical gear and a helical groove guideway of equal pitch formed integrally and coaxially adjacent on each sleeve valve, the axes of said cylinders and their sleeve valves being offset and parallel with relation to each other, a common drive shaft having its axis parallel to the axis of said sleeves and carrying two spaced circular driving gears each adapted to mesh with and drive one of said helical gears and two spaced discs each adapted to engage one of said guideways of said sleeve valves to rotate said sleeve valves in the same direction and to simultaneously reciprocate said valves in the same linear direction in their opposed cylinders, said circular driving gears being adapted to maintain a full driving mesh with said helical driven gears as said discs in their engagement with the guideways reciprocate the two sleeves.

RALPH M. HEINTZ.